United States Patent [19]

Peter et al.

[11] Patent Number: 5,226,677
[45] Date of Patent: Jul. 13, 1993

[54] ROTARY JOINT WITH EXTENDED LIFE SEAL

[75] Inventors: John H. Peter, Three Rivers; Gerald L. Timm, Schoolcraft, both of Mich.

[73] Assignee: The Johnson Corporation, Three Rivers, Mich.

[21] Appl. No.: 743,445

[22] Filed: Aug. 9, 1991

[51] Int. Cl.⁵ ............................................. F16L 17/00
[52] U.S. Cl. ........................................ 285/11; 285/94; 285/134; 285/136; 285/190; 285/279; 285/332.1
[58] Field of Search .................. 285/94, 11, 134, 136, 285/190, 332.1, 279, 122

[56] References Cited

U.S. PATENT DOCUMENTS

| | | | |
|---|---|---|---|
| 1,420,454 | 6/1922 | Smith | 285/134 |
| 1,666,637 | 4/1928 | Aldrich et al. | |
| 1,774,179 | 8/1930 | MacGregor | 285/11 X |
| 1,896,062 | 2/1933 | Berry | |
| 1,994,169 | 3/1935 | Comins | 285/11 |
| 2,038,855 | 4/1936 | Rosenblad | 285/10 |
| 2,384,281 | 9/1945 | Carter | 285/134 X |
| 2,402,224 | 6/1946 | Hornbostel | 285/10 |
| 2,462,006 | 2/1949 | Schmitter et al. | 285/190 X |
| 2,496,471 | 2/1950 | Hornbostel | 285/10 |
| 2,717,166 | 9/1955 | Hedden | 285/134 |
| 2,805,086 | 9/1957 | Shumaker | 285/134 |
| 2,836,439 | 5/1958 | Moore | 285/279 |
| 2,873,538 | 2/1959 | Shumaker | 285/134 X |
| 2,985,408 | 5/1961 | Shaw et al. | 285/190 |
| 3,002,769 | 10/1961 | Deubler et al. | 285/190 X |
| 3,061,337 | 10/1962 | Shaw et al. | 285/134 |
| 3,309,114 | 3/1967 | Morton | 285/11 |
| 4,090,362 | 5/1978 | Bourque | 60/679 |
| 4,194,707 | 3/1980 | McCracken | 285/134 |
| 4,235,572 | 11/1980 | Winkler et al. | 418/6 |
| 4,449,738 | 5/1984 | Hotger | 285/11 |
| 4,477,107 | 10/1984 | Ferguson et al. | 285/279 |
| 4,705,302 | 11/1987 | Beiley | 285/94 X |
| 5,067,753 | 11/1991 | Porel | 285/11 X |

FOREIGN PATENT DOCUMENTS

| | | | |
|---|---|---|---|
| 939186 | 2/1956 | Fed. Rep. of Germany | 285/134 |
| 0379003 | 8/1932 | United Kingdom | 285/134 |
| 0517520 | 2/1940 | United Kingdom | 285/134 |
| 0555389 | 8/1943 | United Kingdom | 285/134 |

Primary Examiner—Eric K. Nicholson
Assistant Examiner—Heather Chun
Attorney, Agent, or Firm—Beaman & Beaman

[57] ABSTRACT

The invention pertains to a rotary joint for use with rotating machinery, such as a dryer drum, where the joint is conveying steam by means of a rotating nipple and sealing structure. The primary elements are a stationary housing comprised of a head, body and a wear plate, a pickup tube and a spring biased nipple with a collar which engages a molybdenum lubricated reverse radius seal ring. Alignment of the components is maintained through the interaction of two guide bearings supporting the nipple, the wear plate sealing surface and the nipple collar which is spring biased against a reverse radius seal ring intermediate the wear plate sealing surface and the nipple collar sealing surface. The invention includes a plurality of radial slots defined on the nipple collar sealing surface which reduce seal loading when steam is applied to the joint by reducing the area subjected to a differential pressure, and which lubricate the sealing surface with steam and a dry lubricant impregnated reverse radius seal ring positioned intermediate the wear plate and the nipple collar sealing surfaces.

1 Claim, 1 Drawing Sheet

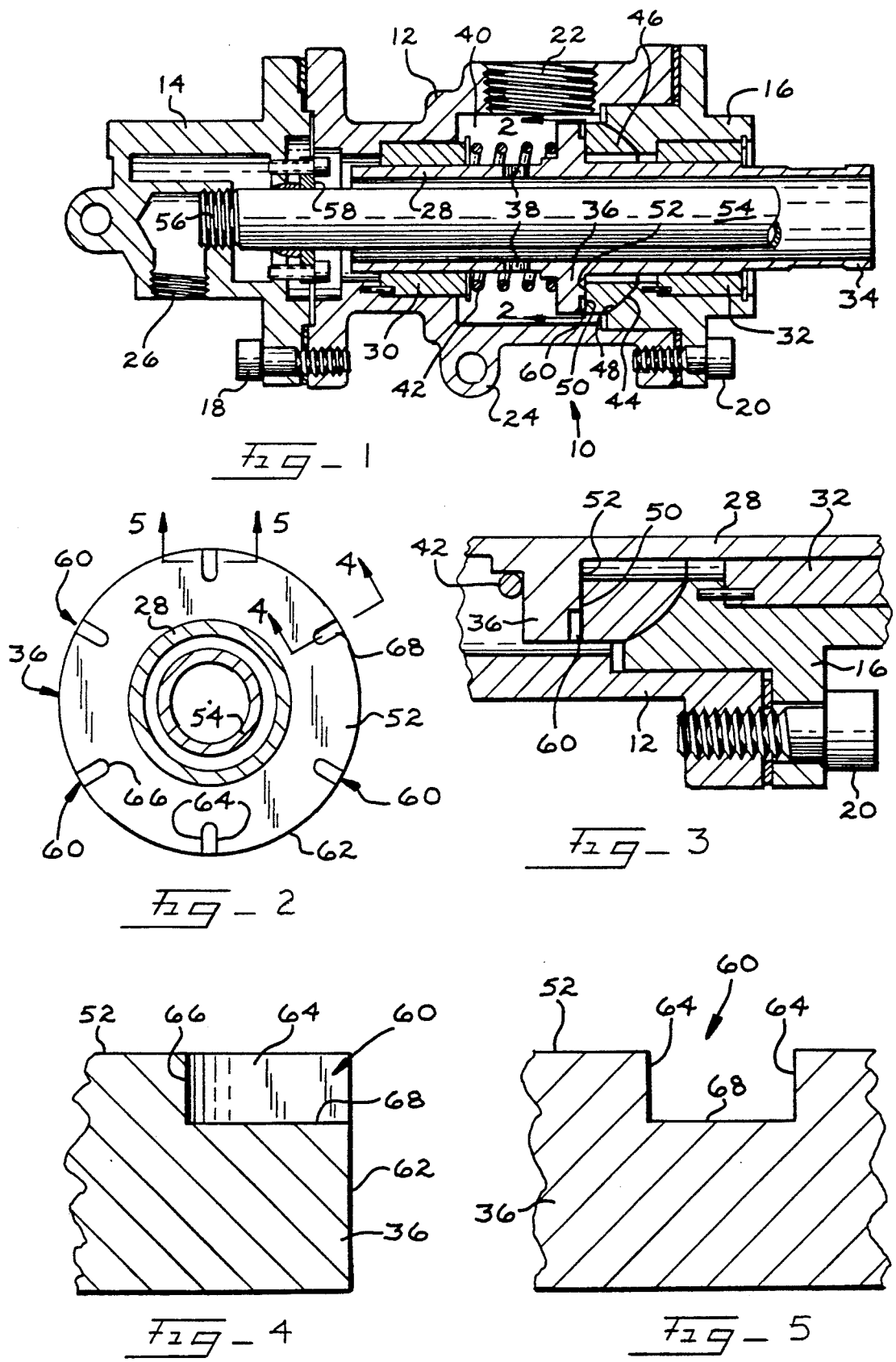

ROTARY JOINT WITH EXTENDED LIFE SEAL

BACKGROUND OF THE INVENTION

Field of the Invention

The present application relates to a rotary joint for supplying steam to a rotary machine, such as a dryer drum; more particularly to a reverse radius seal system employed therein.

Description of Related Art

Rotary joints have long been used to interconnect stationary conduits with rotary members, such as drying drums or cooling drums. Such rotary joints are widely used in the paper making and web processing arts. A great deal of expansion takes place when warming up a steam drying system because of the considerable length of the drum and other components employed for drying drum systems. To permit the components to freely move and seal during all stages of operation, steam connections are made at the steam fitting end; the drying drum journal on the opposite end generally having end thrust against its supporting bearing.

Devices of the type described above are known in the art, for example, from the U.S. Pat. Nos. 1,666,637, 1,896,062 and 2,496,471. These inventions utilize a system of irregularly shaped depressions on annular plate sealing surfaces in conjunction with a bellows arrangement which acts as a force multiplier to proportionally increase the differential pressure acting upon the sealing surfaces. The principle employed is to configure the sealing surfaces that come in contact with the sides of a carbon ring seal such that a central annular continuous sealing surface and a larger peripheral interrupted sealing surface are in contact with each side of the seal ring; the larger area being subjected to the same steam pressure prevents the smaller area from being lifted off by steam pressure.

This configuration therefore minimally contributes to the goal of reducing seal wear because as the steam pressure increases, the amount of force exerted on the seal increases; the addition of sealing surface depressions being specifically intended to increase this force. With the steam pressure staying the same, by adding slots which decrease contact area, the steady state contact pressure at the seal face increases resulting in higher seal wear and torque.

The employment of reverse radius seal rings in rotary joints is known in the art from U.S. Pat. No. 2,836,439 which employs a seal of this type in conjunction with a collar having a seating surface which is continuous and uniform. As a result of this configuration, as the steam pressure increases, the compressive force applied to the seal increases thereby causing increased frictional heating of the seal. The friction results in seal wear and torque which inhibits drum rotation and reduces component life.

OBJECTS OF THE INVENTION

It is an object of the invention to provide a rotary joint employing a reverse radius seal ring with increased seal life.

It is a further object of the invention to provide a rotary joint which features reduced seal friction resulting in lower seal temperatures and torque requirements.

SUMMARY OF THE INVENTION

The rotary joint of the invention is used to connect a steam source to a rotary apparatus such as a paper drying drum. The joint includes a self-supporting ductile cast iron housing comprised of three parts, a head, a body and a wear plate. The head may include a condensate outlet port to which is connected an external condensate return system; and a steam inlet port is defined in the housing body adjacent the housing body inner end. The body outer end is connected to the head forming a chamber with an opening in the wear plate which is opposite the head adjacent the housing body inner end; a nipple and a coaxial condensate pick-up tube extend through the opening for attachment to the rotary apparatus to be served.

A threaded housing condensate pick-up tube connection is defined in the head concentric to the housing axis which opens toward the housing body inner end. The pick-up tube connection receives return condensate and communicates with a condensate return port also defined in the head. A condensate pick-up tube engages the threaded pick-up tube connection and coaxially extends therefrom within the nipple and both extend out the body inner end to the rotary drum. Internally, the nipple is supported by a pair of annular carbon guide bearings disposed adjacent each body end; and a seal ring system comprised of an annular nipple collar which homogeneously extends from the nipple outer surface into the body cavity and defines a flat radial sealing surface on its inner face which engages antimony impregnated reverse radius seal ring having flat and spherical sealing surfaces. The collar sealing surface includes circumferentially spaced radial slots which reduce the seal loading and friction. A nipple circumscribing compression spring engages the nipple collar face opposite its sealing surface thereby biasing the nipple toward the body inner end against the reverse radius seal ring.

The radial slots defined in the nipple collar radial sealing surface communicate with the housing steam pressure and reduce the axial pressure forces acting upon the nipple which tend to increase the seal pressures on the seal ring, thereby providing extended seal ring life. The seal ring friction is also reduced by using molybdenum disulfide at the seal ring mating surfaces, a superior lubricant which exhibits extraordinary stability in high temperature environments as well as when exposed to water or steam.

BRIEF DESCRIPTION OF THE DRAWINGS

In order that the invention may be clearly understood, it will now be described, by way of example, with reference to the accompanying drawings, wherein:

FIG. 1 is a diametrical, elevational, cross-section view as taken through a rotary joint employing the invention principles, FIG. 2 is an enlarged elevational, cross-sectional view of the collar sealing surface as taken along Section 2—2 of FIG. 1, FIG. 3 is an enlarged detailed elevational view of the reverse radius seal showing portions of and the spatial relationships of the bias spring, nipple collar with a slot in cross-section, reverse radius seal ring and adjacent rotary joint structure, FIG. 4 is an enlarged detail elevational view of a nipple collar slot as taken along Section 4—4 of FIG. 2, and FIG. 5 is an enlarged detail elevational view of a nipple collar slot as taken along Section 5—5 of FIG. 2.

DESCRIPTION OF THE PREFERRED EMBODIMENTS

A rotary joint utilizing the extended life seal of the invention is generally indicated at 10, and the joint includes the tubular body 12, the head 14 located at the outer end of the body and the wear plate 16 attached to the body inner end. The body, head and wear plate may be formed of ductile cast iron, and the head 14 is attached to the body 12 by threaded bolts 18 extending through opposed flanges, while the wear plate 16 is removably attached to the body 12 by bolts 20 extending through the wear plate flange and threaded into the body.

The body 12 is provided with a threaded steam inlet port 22 which communicates with the interior of the body, and a bracket 24 defined upon the body cooperates with conventional rotary joint support structure, not shown, for supporting the joint adjacent a dryer drum, not shown. The head 14 includes a threaded condensate removal port 26 for cooperation with the syphon system, as later described.

A generally cylindrical elongated tubular nipple 28 is rotatably supported within the body 12 and wear plate 16 upon cylindrical guide bushings 30 and 32 respectively located within the body and wear plate. The guide bushings permit the nipple 28 to rotate relative to the body, head and wear plate; and the nipple includes an inwardly extending extension 34 for attaching the nipple to the rotating dryer drum, not shown, by conventional connection means whereby steam introduced into the joint 10 may be transferred to the dryer drum.

The nipple includes an outwardly radially extending collar 36, and radial ports 38 are defined in the nipple to permit communication between the nipple interior and the cavity 40 defined within the body 12 which is in communication with the inlet port 22. Accordingly, steam introduced into the joint 10 through port 22 will enter the nipple 28 for supplying the dryer drum, not shown.

The nipple 28 is axially biased inwardly by the compression spring 42 surrounding the nipple and compressed between the collar 36 and the guide bushing 30. As will be later apparent, the biasing force of the spring 42 will maintain engagement of the joint sealing surfaces prior to the introduction of pressurized steam or other medium into the joint.

The wear plate 16 includes a spherical concave seal surface 44 having a center of generation lying upon the axis of the joint 10, which also constitutes the axis of rotation of the nipple 28.

An annular seal ring 46, preferably formed of carbon or graphite, is located between the wear plate 16 and the nipple collar 36, and the seal ring includes a spherical convex surface 48 which corresponds to and engages the wear plate seal surface 44. Because the seal ring 46 departs from the usual seal configuration it is designated as being of a "reverse radius". The seal ring 46 also includes an outer radial flat surface 50 facing and engaging the opposed flat radial surface 52 defined upon the nipple collar 36. The axial biasing force imposed upon the nipple 28 by the spring 42 will maintain engagement of the surfaces 44 and 48, and 50 and 52.

In the embodiment shown in FIG. 1 a syphon pipe 54 coaxially extends through the nipple 28 having an inner end, not shown, located within the dryer drum for picking up condensate therein. The outer end of the syphon pipe 54 is threaded into threads 56 defined in head 14 which establishes communication between the syphon pipe 54 and the condensate outlet port 26. The outer end of the syphon pipe 54 is also supported by the adapter 58 bolted to the head 14.

The improved sealing and wearing characteristics are achieved by a plurality of linear radial slots 60 defined in the nipple collar surface 52 engaging the seal ring surface 50. The radial slots 60, six in number in the disclosed embodiment as will appreciated from FIG. 2, are located at 60° intervals about the surface 52 and each slot intersects the circular periphery 62 of the nipple collar 36. Each slot is formed by linear parallel sides 64 which intersect the periphery 62, and each slot includes a closed end 66 and a base 68 intersecting the sides 64 and the periphery 62.

The slots 60 are of a radial length substantially one-half the radial dimension of the collar surface 52, as will be appreciated from FIG. 2. The width of the slots, as defined by opposed sides 64, is, preferably, less than one-half of the radial slot lengths.

As the slots 60 intersect the nipple collar periphery 62 each of the slots will be in communication with the cavity 40 defined in the body 12 whereby the steam pressure within the cavity 40 will exist within the slots 60, and because of the communication of the slots with the pressurized steam dual advantages are achieved.

Because the steam pressure within the cavity 40 exists within the slots 60 steam pressure acting upon the slot bases 68 produces an axial force on the nipple collar and nipple 28 toward the left, FIG. 1, which helps to counteract the axial force imposed upon the nipple by the spring 42 and steam pressure within cavity 40 acting upon collar 36 to bias the collar toward the seal ring 46. This reduced axial force on the collar 36 toward the seal ring 46 reduces the friction between the surfaces 50 and 52, and 44 and 48 extending the life of the seal ring 46.

The presence of the slots 60 also permits steam and water to enter between the seal ring surface 50 and the nipple collar surface 52 which tends to lubricate these engaging sealing surfaces and reduce friction which also results in extending the life of the seal ring 46.

Seal life is further enhanced by using low friction, high abrasion resistant seal materials. Accordingly, it is preferred that the carbon or graphite seal ring 46 be impregnated with antimony and the surfaces 44 and 52 are treated with a dry lubricant, such as molybdenum disulfide such as sold under trade names MOLY-COAT or EVERLUBE, and use of such materials further adds to the extended seal ring life.

It will be appreciated from the above description that by utilizing a nipple having a flat radial surface 52 defined thereon into which the slots 60 may be formed that the inventive concepts may be readily practiced without requiring complicated machining techniques, and the disclosed construction and association of components permits the invention to be practiced and manufactured in its most economical form.

It is appreciated that various modifications to the inventive concepts may be apparent to those skilled in the art without departing from the spirit and scope of the invention.

We claim:

1. A rotary joint for use with a drum rotating about an axis particularly characterized by its employment of an extended life seal, comprising, in combination:

A. an elongated tubular housing having an axis, an inner end and an outer end, a chamber defined within said housing, an inlet port defined in said housing in communication with said chamber, a concave spherical sealing surface defined on said housing adjacent said inner end concentric to said housing axis and defining a portion of said chamber, B. an elongated tubular nipple concentrically axially displaceably and rotatably mounted within said housing having an inner end coaxially extending from said housing inner end and a central region within said chamber, at least one port defined in said nipple central region communicating with said chamber, an annular collar defined on said nipple central region radially extending into said chamber and having a periphery, a flat radial sealing surface defined on said collar in opposed axially spaced relation to said housing sealing surface, a plurality of radial slots defined in said collar sealing surface in communication with said chamber, said slots being circumferentially spaced at 60° intervals on said collar sealing surface and having a linear configuration having substantially parallel sides and an inner closed end and intersection said collar sealing surface throughout their length and intersecting said nipple collar periphery, said slots having a radial length substantially equal to one-half of the dimension of said collar sealing surface, and a width less than one-half of the radial length of the associated slot, and C. an annular seal ring located between said housing and collar sealing surfaces, said seal ring having a flat radial outer surface engaging said collar sealing surface, and an inner convex spherical sealing surface complementary in configuration to said housing concave spherical sealing surface engaging said housing sealing surface, said seal ring outer and inner surfaces being treated with a dry lubricant, pressurized medium within said slots aiding to counteract axial forces imposed on said collar by the pressurized medium within said chamber, and said slots aiding the lubrication of said collar sealing surface and said seal ring outer surface.

* * * * *